United States Patent [19]

Terry et al.

[11] Patent Number: 5,168,928
[45] Date of Patent: Dec. 8, 1992

[54] PREPARATION AND USE OF GELABLE SILICATE SOLUTIONS IN OIL FIELD APPLICATIONS

[75] Inventors: Dralen T. Terry, Lawton; Edward F. Vinson, Duncan, both of Okla.

[73] Assignee: Halliburton Company, Duncan, Okla.

[21] Appl. No.: 745,562

[22] Filed: Aug. 15, 1991

[51] Int. Cl.$^5$ .................. E21B 33/138; E21B 33/16
[52] U.S. Cl. .................... 166/292; 166/291; 166/300; 106/633
[58] Field of Search ............... 166/291, 292, 270, 300; 106/600, 633

[56] References Cited

U.S. PATENT DOCUMENTS

| | | | |
|---|---|---|---|
| Re. 32,742 | 9/1988 | Skjeldal | 106/633 X |
| 2,025,948 | 12/1935 | Jorgensen | 166/292 X |
| 3,146,828 | 9/1964 | Mann | |
| 3,303,882 | 2/1967 | Browning | 166/292 |
| 3,482,634 | 12/1969 | Cox | 166/292 |
| 3,965,986 | 6/1976 | Christopher | 166/270 X |
| 3,990,903 | 11/1976 | Mallow | 106/635 X |
| 4,014,174 | 3/1977 | Mondshine | |
| 4,428,424 | 1/1984 | Lacy et al. | 166/292 X |
| 4,505,751 | 3/1985 | Sydansk | |
| 4,732,213 | 3/1988 | Bennett et al. | 166/292 |
| 4,935,060 | 6/1990 | Dingsyr | 166/292 X |

FOREIGN PATENT DOCUMENTS 1198186  12/1985  U.S.S.R. ............... 166/292

*Primary Examiner*—George A. Suchfield
*Attorney, Agent, or Firm*—Thomas R. Weaver; C. Clark Dougherty, Jr.

[57] ABSTRACT

A gelable silicate solution prepared by mixing fumed silica and an alkali metal hydroxide with water is provided. The silicate solution is used to form a seal or plug in one or more subterranean formations or in a well bore penetrating the formations by pumping the solution into a desired location in the well bore or formations and allowing the silicate solution to gel therein.

7 Claims, No Drawings

PREPARATION AND USE OF GELABLE SILICATE SOLUTIONS IN OIL FIELD APPLICATIONS

BACKGROUND OF THE INVENTION

1. Field of the Invention.

The present invention relates generally to gelable silicate solutions, and more particularly, to such solutions, their preparation and their use in oil field applications.

2. Description of the Prior Art.

In oil and gas well completion and remedial operations, cement compositions which set into hard substantially impermeable masses are commonly utilized. For example, in primary cementing, a cement composition, usually a hydraulic Portland cement composition, is pumped down a casing or liner disposed in a well bore and then upwardly into the annulus between the casing or liner and the walls of the well bore. Upon setting, the cement composition bonds the casing or liner to the well bore walls whereby the casing or liner is held in place and whereby interstitial voids in formations penetrated by the well bore are sealed and fluid communication or flow in the annulus is prevented.

A secondary remedial cementing process known as squeeze cementing is utilized to repair defects due to corrosion, failures in the primary cement and the like. In squeeze cementing operations, the problem area is isolated and a cement composition is forced into the annulus and/or portions of the formations penetrated by the well bore to provide seals therein.

In other applications, cement compositions are injected into subterranean formations to plug high permeability anomalies existing near the well bore. Such anomalies include fractures, thief zones and vugs which diminish the intended function of wells. For example, such anomalies diminish the performance of enhanced recovery injection wells by diverting the injected fluid away from hydrocarbon containing zones, and they diminish the performance of production wells by causing undesirable water production and the like.

As mentioned above, in carrying out the above described cementing processes, Portland cement compositions have most commonly been used. However, other cement compositions including mixtures of Portland cement and sodium silicate and other silica containing compositions have been utilized in oil field applications. For example, U.S. Pat. No. 3,146,828 issued Sep. 1, 1964 discloses a siliceous cement composition consisting of sodium silicate, a finely divided solid suspending agent, a siliceous aggregate, water and a stabilizing agent which forms a permeable solid upon setting. The permeable solid is utilized in wells to provide a barrier which prevents incompetent sands or the like from flowing into the well bore with produced hydrocarbons.

U.S. Pat. No. 4,014,174 issued on Mar. 29, 1977 discloses a method of strengthening the surface of a well bore and improving a subsequent Portland cement bond thereto by pretreating the zone to be cemented with an alkali metal silicate solution containing silica and causing the solution to form a gel therein.

U.S. Pat. No. 4,505,751 issued on Mar. 19, 1985 discloses a process for utilizing a silicate/silica cement composition in oil field applications. The cement composition is comprised of silica combined with an aqueous silicate solution which reacts over time to form a solid. The silicate/silica composition is utilized in well completion and remedial operations of the type described above.

While the above described and other aqueous silicate compositions have been utilized successfully in oil field applications, they generally include an alkali metal silicate such as sodium silicate which is relatively expensive. The alkali metal silicate can be utilized in liquid form, but liquid alkali metal silicate has the disadvantage that it freezes at a relatively high temperature and undergoes a chemical change upon being thawed. Dry alkali metal silicate compositions are also used, i.e., the dry components of a silicate composition such as dry sodium silicate, a dry solid filler and a dry buffer are mixed with water at the site of the well in which the silicate composition is to be used. A disadvantage of this procedure is that the dry solid materials are difficult to dissolve in the water, particularly when the water is at a relatively cold temperature.

Thus, there is a need for a less expensive source of alkali metal silicate which can be delivered to a well site in dry solid form and readily dissolved in cold water just prior to use.

SUMMARY OF THE INVENTION

The present invention meets the needs described above by providing dry solid components which can be dissolved in water at the well site to form a gelable silicate solution. The gelable silicate solution will react with formation water or other components in the well over time to form a solid gel, or the solution can be substantially instantaneously gelled by reaction with multivalent cations. Upon being mixed with water, the dry solid components react exothermically whereby the water is heated and the time required for the completion of the mixing and reaction process is considerably shortened. In addition, the components utilized to form the silicate solution are considerably less expensive than alkali metal silicate, e.g., sodium silicate.

In accordance with the method of the present invention, a gelable aqueous silicate solution is prepared by mixing solid fumed silica and a solid alkali metal hydroxide with water to form an aqueous solution. The fumed silica is a colloidal form of silica, i.e., a fine dry powder containing in the range of from about 60% to about 100% by weight silicon dioxide with the remainder being various metal oxides. The fumed silica can be produced in various ways and is a byproduct in the manufacture of silicon or ferrosilicon. When fumed silica is reacted with an alkali metal hydroxide in water, a viscous aqueous fluid is produced which converts to a gelable alkali metal silicate solution.

Once formed, the aqueous reaction mixture of fumed silica and alkali metal hydroxide is utilized to form a seal or plug in one or more subterranean formations or in a well bore penetrating the formations by pumping the aqueous composition into a desired location in the well bore or formations penetrated thereby and then allowing the silicate solution to gel. The gelation process is accelerated when the silicate solution is contacted with multivalent cations or other acid generating catalysts.

It is, therefore, a general object of the present invention to provide improved gelable silicate solutions for use in oil field applications.

A further object of the present invention is the provision of gelable silicate solutions which are less expensive and more easily prepared at well sites. The gelable silicate solutions of this invention also possess sufficient viscosity to carry solid bridging materials into the well bore. This is frequently desired when fractures or voids exist in the formation.

Other and further objects, features and advantages of the present invention will be readily apparent to those skilled in the art upon a reading of the description of preferred embodiments which follows.

DESCRIPTION OF PREFERRED EMBODIMENTS

The present invention provides improved gelable silicate solutions, methods of preparing the solutions and methods of using the solutions in oil field applications. The silicate solutions can be utilized independently to form seals and plugs in subterranean formations or in well bores penetrating the formations, or the silicate solutions can be used in combination with Portland cement compositions. For example, a gelable silicate solution of this invention can be pumped into a well bore whereby the walls of the well bore are contacted therewith prior to performing primary, secondary or other cementing operations in the well bore and/or formations penetrated thereby. The silicate solution forms a stiff gel on the walls of the well bore and thereby facilitates the formation of a strong bond and seal when a Portland cement composition is subsequently placed in the well bore and allowed to set therein. The term "gelable silicate solution" is used herein to mean that the silicate solution is reactive and forms a substantially impermeable stiff gel when it reacts with subterranean formation brine and/or other components contained in subterranean formations, particularly multivalent cations.

In preparing a gelable silicate solution of this invention, fumed silica and alkali metal hydroxide are mixed in water to form an aqueous solution. The mixing can take place using any type of continuous or batch mixing apparatus, and the aqueous silicate solution is preferably prepared at the site of the well in which it is to be utilized. Because the reaction between the fumed silica and alkali metal hydroxide is exothermic, the mixing water is heated as the reaction proceeds thereby shortening the time required for forming the aqueous silicate solution. The fumed silica and alkali metal hydroxide can be dry blended with sand, bridging materials, weighting materials, fillers or other dry components prior to being mixed with water.

While various alkali metal hydroxides can be utilized, e.g., potassium hydroxide, lithium hydroxide, sodium hydroxide, etc., sodium hydroxide is the most preferred because of its availability and low cost.

The water used to form the gelable aqueous silicate solution of this invention is preferably fresh water, but other water can be used provided multivalent cation salts are not present therein at a concentration over about 0.5% by weight.

The fumed silica is preferably mixed with the water in an amount in the range of from about 3 parts to about 30 parts by weight per 100 parts of water. The alkali metal hydroxide is preferably mixed with the water in an amount in the range of from about 0.2 part to about 1 part by weight per part of fumed silica mixed therewith. While the fumed silica and alkali metal hydroxide can be mixed with the water in any order, simultaneous mixing is preferred so that the water is heated as the mixing progresses.

The most preferred gelable silicate solution of this invention is comprised of fumed silica mixed with fresh water in an amount of about 25 parts by weight per 100 parts of water and sodium hydroxide mixed therewith in an amount of about 0.3 part by weight per part of fumed silica.

Once the gelable aqueous silicate solution of the present invention has been prepared, it is pumped into a well bore as a part of a completion or remedial operation. When used as a conditioning flush ahead of a Portland cement composition on a primary cementing job, the silicate solution aids in controlling brine flows, sealing lost circulation zones and improving cement bonding and displacement. The aqueous silicate solution is gelled when it contacts reactive components in the well bore or subterranean formations penetrated thereby. In non-reactive fresh water or low brine concentration zones, a brine spearhead containing multivalent cation salts can be pumped into the zones prior to pumping the gelable aqueous silicate solution therein. Multivalent cation salts which can be utilized include acetate, chloride, nitrate or sulfate salts of calcium, magnesium, aluminum, iron and the like with calcium chloride being the most preferred. When a spearhead brine containing one or more multivalent cation salts is utilized ahead of the gelable aqueous silicate solution, the brine preferably contains at least about 5% percent by weight multivalent cation salt.

The method of this invention for forming a seal or plug in one or more subterranean formations or in a well bore penetrating the formations comprises the steps of mixing fumed silica and an alkali metal hydroxide with water to form an aqueous silicate solution; pumping the silicate solution into a desired zone or location in the well bore or formations; and allowing the silicate solution to gel in the well bore or formations to thereby form the seal or plug therein.

When the zone or location in the formations or well bore does not already include highly reactive components therein, a brine solution containing at least about 5% by weight multivalent cation salt, preferably calcium chloride, can be pumped into the zone or location prior to pumping the gelable aqueous silicate solution therein. Alternatively, catalysts may be added to the silicate solution which will promote its gelation. Examples well known in the industry are urea or sodium acid pyrophosphate which are used with commercial silicate solutions to cause gellation. When the silicate solution is utilized as a preflush or spacer solution ahead of Portland cement in a primary or secondary cement operation, the Portland cement composition utilized is pumped into the location or zone to be cemented after the gelable silicate solution has been placed therein. In order to further illustrate the methods and compositions of this invention, the following examples are given. In the examples, a fumed silica sample containing about 75% by weight silicon dioxide was used either dry or as a 50% slurry in water. Sodium hydroxide was added as a 25% by weight solution in water.

EXAMPLE 1

To 50 grams of fumed silica in 150 grams water was added 66 g of a 25% by weight solution of sodium hydroxide in water. The solution thickened dramatically. Fann viscometer readings were:
600 rpm—44 centipoise (cp)
300 rpm—36 cp
200 rpm—33 cp 100 rpm—29 cp The above viscometer readings give a plastic viscosity (PV) of 8 cp and a yield point (YP) of 28 lb/100 ft$^2$:

After three days at room temperature, the mixture had reacted further to give viscosities as follows:
600 rpm—16 cp PV—8 cp
300 rpm—8 cp YP—0
200 rpm—5.5 cp
100 rpm—3 cp These values are consistent with a Newtonian fluid, i.e., a dilute sodium silicate solution.

EXAMPLE 2

To 25 grams of fumed silica in 208 grams water was added 33 grams of 25% by weight NaOH solution. Viscosities on mixing were as follows:
600 rpm—13 cp PV=4 cp
300 rpm—9 cp YP=5 lb/100 ft$^2$:
200 rpm—7 cp
100 rpm—5.5 cp A portion of this sample was heated to 180° F. for four hours and then cooled. Its viscosity was reduced and it exhibited no yield point, again typical of a dilute sodium silicate solution.

The silicate mixtures, whether freshly prepared or aged, showed the immediate reaction with calcium chloride which is typical of sodium silicate solutions.

Thus, the present invention is well adapted to carry out the objects and attain the ends and advantages mentioned as well as those which are inherent therein. While numerous changes in the invention may be made by those skilled in the art, such changes are encompassed within the spirit of this invention as defined by the appended claims.

What is claimed is:

1. A method of forming a seal or plug in one or more subterranean formations or in a well bore penetrating the formations comprising the steps of:
   (a) mixing fumed silica and an alkali metal hydroxide with water to form an aqueous silicate solution;
   (b) pumping said silicate solution into a desired location in said well bore or formations; and
   (c) allowing said silicate solution to gel in said well bore or formations to thereby form said seal or plug therein wherein said fumed silica is mixed with said water in an amount in the range of from about 3 parts to about 30 parts by weight per 100 parts of water.

2. The method of claim 1 wherein said water is fresh water.

3. The method of claim 1 wherein said alkali metal hydroxide is sodium hydroxide.

4. The method of claim 1 wherein said alkali metal hydroxide is mixed with said water in an amount in the range of from about 0.2 part to about 1 part by weight per part of fumed silica mixed therewith.

5. The method of claim 1 wherein said water is fresh water, said fumed silica is mixed therewith in an amount of about 25 parts by weight per 100 parts of water and said alkali metal hydroxide is sodium hydroxide mixed with said water in an amount of about 0.3 part by weight per part of fumed silica mixed therewith.

6. The method of claim 1 which is further characterized to include the step of pumping an aqueous solution containing a multivalent cation salt into said location within said well bore or formations prior to pumping said silicate solution thereinto.

7. The method of claim 6 wherein said multivalent cation salt is calcium chloride.

* * * * *